United States Patent [19]

Herbold

[11] 4,062,474

[45] Dec. 13, 1977

[54] APPARATUS FOR METERED FEEDING OF POORLY FLOWABLE MATERIALS

[75] Inventor: Oskar Herbold, Meckesheim, Germany

[73] Assignees: Helma Lampl, Sinsheim-Rohrbach, Germany

[21] Appl. No.: 683,412

[22] Filed: May 5, 1976

[30] Foreign Application Priority Data

May 9, 1975 Germany .............................. 2520755

[51] Int. Cl.² .......................... B30B 5/04; G01F 11/10
[52] U.S. Cl. ..................................... 222/36; 100/151; 222/345; 222/371
[58] Field of Search .................... 222/290, 371, 56, 36, 222/345; 53/124 E, 124 CC; 100/151-154; 141/71, 80, 81; 198/732; 221/7

[56] References Cited

U.S. PATENT DOCUMENTS

| | | | |
|---|---|---|---|
| 1,386,974 | 8/1921 | Templeton | 221/7 |
| 1,755,618 | 4/1930 | Watzl | 222/290 X |
| 2,118,205 | 5/1938 | Klöne | 100/151 X |
| 2,415,355 | 2/1947 | Kaufmann et al. | 100/151 X |
| 2,589,836 | 3/1952 | Martin | 198/732 X |
| 2,638,248 | 5/1953 | Alvord | 222/56 |
| 3,126,819 | 3/1964 | Wehner | 100/151 X |
| 3,275,118 | 9/1966 | McCain et al. | 198/732 X |

*Primary Examiner*—Robert B. Reeves
*Assistant Examiner*—Francis J. Bartuska
*Attorney, Agent, or Firm*—Anthony J. Casella

[57] ABSTRACT

In an apparatus for the metered feeding of poorly flowable materials by endless conveyor belt having an upper and lower run, the conveyor belt includes carrier plates which define pockets for conveying the material from an inlet through a compacting zone and a metering zone, to an outlet at which the metered compacted material is released from the pockets and allowed to pass out of the outlet. In the metering zone the upper and lower runs of the conveyor belt are maintained in close adjacency such that the inward ends of the plates on the upper and lower runs of the conveyor belt cooperate with each other to provide a known amount of material in the pockets on the lower run of the conveyor belt.

17 Claims, 3 Drawing Figures

APPARATUS FOR METERED FEEDING OF POORLY FLOWABLE MATERIALS

The invention relates to an apparatus for the metered feeding of a poorly flowable material, such as peat, garden mould, and the like, from a delivery station to a sacking station by means of an endless rotating conveyor provided with equipment for metered conveying.

For the volumetric metering of materials it is already known to use endless rotating belts provided with pockets or to use vessels disposed on rotating plates, these being filled with the material which is thereupon discharged in metered amounts in this manner. For the volumetric metering of products use is also made of bucket wheels and similar arrangements.

These known equipments have the disadvantge of being liable to break down, particularly when the products are enriched with hard materials or fibres. If in addition the products have to be compacted upstream of the delivery station, a special compaction apparatus must be provided, so that the total construction of such equipments becomes relatively complicated.

The problem underlying the invention therefore consists in so developing the apparatus of the kind first mentioned above that with its aid undisturbed transport of the poorly flowable material from the delivery station to the packing station, with simultaneous compaction of the material, can be achieved in a simple manner.

In an apparatus of the kind first described above this problem is solved by means of a conveyor trough provided with a filler on its upper side, an outlet aperture on the lower side, and endless conveyor elements which are guided in the side walls and which are joined by carriers extending transversely to the direction of movement of the conveyor elements, the distance between the carriers and the conveyor trough wall opposite them decreasing between the filler and the outlet aperture substantially until contact is made between the outer edges of the carriers and the wall, and also by means of a stipper device associated with the inner edges of the carriers upstream of the outlet aperture, in the direction of movement of the conveyor elements.

This apparatus provides the advantage that it is of extremely simple construction, works in an operationally reliable manner, and delivers metered amounts of compacted material at the outlet aperture, so that when the product delivered is packed into the packing the latter is tightly filled with product.

The carriers extend in the direction of the wall of the conveyor trough and taper in the form of wedges from their inner edge to their outer edge. The conveyor elements advantageously consist of chains on which the carriers are fastened by means of resiliently elastic elements permitting pivoting. The resiliently elastic elements may be rubber pivot elements. The carriers constructed in this manner permit yielding if jamming forces caused by hard materials exceed a determined value.

In the region of the deflection of the conveyor elements which is situated between the filler and the outlet aperture the wall of the conveyor trough is adjustable in respect of its distance from the outer edges of the carriers. This means that on the one hand the compaction is effected in the region of the deflection of the conveyor elements and on the other hand this compaction is adjustable by selecting the distance between the wall of the conveyor trough and the ends of the carriers. By means of a slide projecting into the interior of the conveyor trough from the top wall of the latter downstream of the filler, in relation to the direction of movement of the conveyor elements, the quantity drawn into the conveying path is determined. This amount is variable if the distance between the slide and the carrier is adjustable.

In an advantageous further development of the apparatus, the stripper device is formed by the inner edges of the carriers which are guided around the deflection between the outlet aperture and the filler. In order to achieve this, an adjusting device acting on the conveyor elements and deflecting them in the direction of the carriers carrying the material is provided. The upper run of the chains forming the conveyor elements is thus pressed by this adjusting device in the direction of the lower run to such an extent that the inner edges of the carriers are almost in contact with one another, so that by a stripping action the carriers of the upper run accurately meter the material guided between two carriers of the lower run.

The stipper device therefore constitutes an independent invention, even without pre-compacting, for readily flowing substances such as wheat or solid granules which themselves produce their optimum filling weight without restricted compacting.

Full and empty warning devices are expediently disposed in the filler. A switch operated by the carriers may for example operate a counter and also a brake motor, so that one or more metered amounts of material guided between the carriers can be delivered into one and the same sack through the outlet aperture.

The invention is explained more fully by way of example with the aid of the accompanying drawings.

Figure 1:
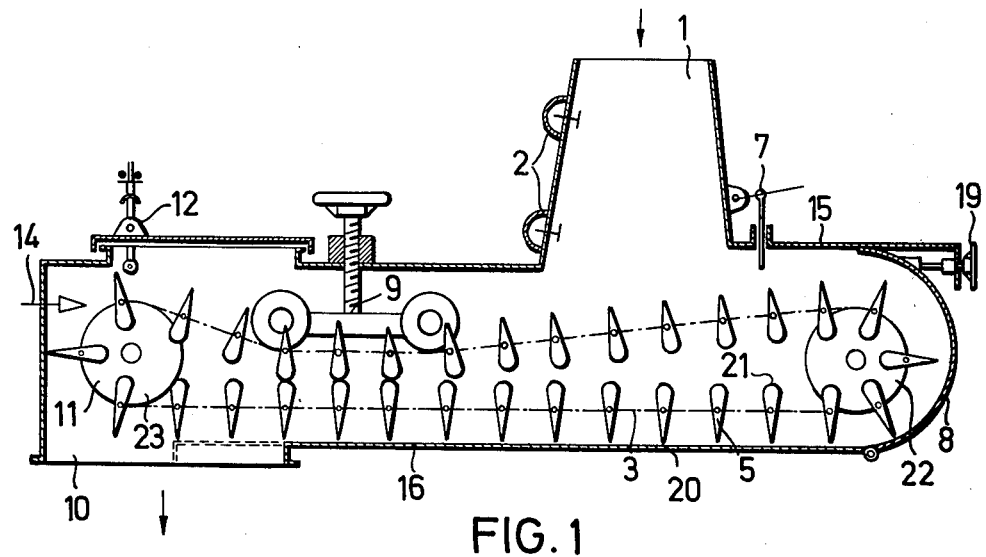
FIG. 1 shows diagrammatically a form of construction of the apparatus in a sectional side view.
Figure 2:
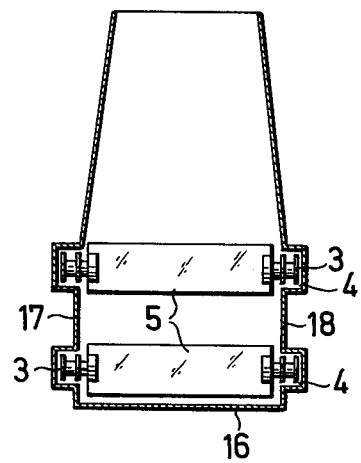
FIG. 2 is a cross-section through the filler of the apparatus shown in FIG. 1.
Figure 3:
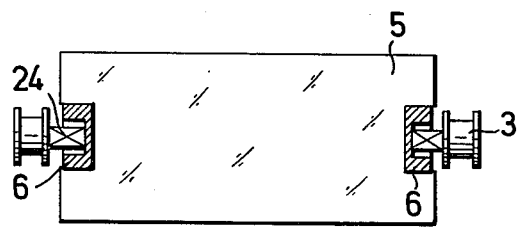
FIG. 3 shows on a larger scale the mounting of a carrier.

The apparatus shown in the drawings consists of a conveyor trough 14, which has an upper side 15, a lower side 16, and also side walls 17 and 18 and is closed by a front wall 8 and a rear wall. On its upper side 15 the conveyor trough 14 has a filler 1 provided with full and empty warning devices 2, while in its lower side 16 it has an outlet aperture 10. In the region of its two ends there are provided in the conveyor troughs 14 deflectors in the form of chain wheels 22 and 23 respectively over which run chains 3, as can be seen in FIG. 2, these chains being guided in recesses in the two side walls 17 and 18 and forming conveyor elements; the chains are driven in synchronism by a drive which is not shown in the drawings. The chains 3 are joined together by carriers 5 extending transversely of their direction of movement. The carriers 5 are disposed at regular intervals along the chains. Each carrier 5 is mounted on the two chains 3 by means of a pin 24 and of a rubber pivot bearing 6 mounted therebetween. The carriers are so disposed that their wide inner edge 21 is situated inside the space bounded by the moving chains 3. Starting from the inner edge 21 the carriers 5 taper in the outward direction in the form of wedges and end in an outer edge 20 which forms a point and which lies outside the space enclosed by the chains 3. The carriers 5 are so mounted that their axis extending through the centre of the inner edge 21 and the tip 20 is at right angles to the lower side 16 of the conveyor through 14, at least in the lower run of the chains 3. Downstream of the filler 1, in the direction of movement of the chains 3, a slide 7 is so disposed in the upper side 15 of the conveyor through 14 that it projects to an adjustable length into the interior of the conveyor trough 14. This slide 7, whose end lies opposite the outer edges 20 of the carriers 5, determines the amount of material drawn into the space downstream of the slide by the carriers 5. This material is now compacted in the region of the deflection 22 of the carriers 5 between the filler 1 and the outlet aperture 10 owing to the fact that the front wall 8 of the conveyor trough 14 is curved so that it reduces the distance between the outer edges 20 of the carriers 5 to such an extent that the outer edges 20 of the carriers 5 are brought practically into contact with the front wall 8 and then with the lower side 16 of the conveyor trough 14. By means of an adjusting device 19 the front wall 8 can be adjusted so that the distance from the outer edges 20 of the carriers 5 can be increased or reduced.

The deflector 23 between the outlet aperture 10 and the filler 1 guides the carriers 5, which between them form the pockets 11, back into the upper run of the chain 3, the carriers 5 thus being brought into contact with a switch 12 of a counter. An adjusting device 9 is in contact with the upper run of the chain 3 upstream of the filler 1, in the direction of movement of the chain 3. The adjusting device 9 comprises two rollers and a threaded spindle which passes through a nut fastened to the conveyor trough. When this spindle is turned the rollers of the adjusting device 9 can move the chain 3 of the upper run in the direction of the lower run to such an extent that the inner edges 21 of the carriers of the upper run and of the carriers of the lower run of the chain 3 come into contact or almost into contact upstream of the outlet aperture 10 in the direction of movement of the lower run of the chain 3.

The apparatus of the invention works in the following manner: The poorly flowable material is filled into the filler 1 in the direction of the arrow until the full warning device 2 responds. The material falls through between the open pockets formed between the carriers 5, so that the entire conveyor trough 14 is filled with material from the floor to the full warning device and substantially from the filler to the front wall 8. While the chains 3 are moving, material is now carried by the carriers 5 past the slide 7 and into the space in the region of the front deflection. Through the constricting action of the front wall 8 of the conveyor trough 14 the material is compacted, since in the region lying thereabove the entire conveyor through 14 is filled with still uncompacted material. The material carried by the lower run of the chains 3 between the carriers 5 and compacted in this manner is metered due to the fact that the inner edges 21 of the carriers 5 of the upper run of the chains 3 are brought by the adjusting device 9 almost into contact with the inner edges 21 of the carriers 5 on the lower run of the chains 3, whereby the material lying above the inner edges 21 is stripped off, so that an accurately known amount of material remains between two carriers 5 and is discharged at the outlet aperture 10. Because of the opening out of the carriers at the deflection 23 the compacted material held in the pocket 11 between two adjacent carriers 5 is released and falls out of the conveyor 14 through the opening 10. By means of a switch 12 a counter and a brake motor can be operated in such a manner that one or more amounts of material corresponding to the pockets 11 are delivered into a sack. In the event of clogging, the carriers 5 will yield by slight rotation on the rubber pivot bearings 6.

What is claimed is:

1. An apparatus for the metered feeding of poorly flowable material, such as peat, garden mould and the like, from a delivery station to a sacking station by means of an endless conveyor belt means having an upper and lower run, said apparatus comprising
  a conveyor housing having an inlet and an outlet,
  a compaction zone having an upstream end and a downstream end, and a metering zone;
  a plurality of spaced carrier plate means disposed transversely on said conveyor belt means, each having an inwardly and an outwardly disposed edge, the inwardly disposed edges of the plate means on the upper run of said conveyor belt means being disposed opposite the inwardly disposed edges of the plate means on the lower run of the conveyor belt means, adjacent pairs of said plate means defining pockets for carrying said material;
  compacting wall means in said compaction zone, said compacting wall means being substantially spaced from said outwardly disposed edges of said conveyor plate means and progressively less spaced from said outwardly disposed edges towards said downstream end for compaction of said material in each said pocket as it progresses through said compaction zone; and
  stripper means disposed in said metering zone, said stripper means being associated with said oppositely faced inwardly disposed edges of said carrier plate means on the upper and lower runs of the conveyor belt means, for volumetrically restricting said material in each said pocket on the lower run of the conveyor belt means in said metering zone.

2. The apparatus of claim 1 wherein said compacting wall means substantially contact said outwardly disposed edges of said conveyor plate means at said downstream end of said compaction zone.

3. The apparatus of claim 1 wherein a first deflector roller is provided in said compaction zone, said conveyor belt means being deflected over said first roller and said compacting wall means being substantially curved.

4. The apparatus of claim 1 wherein a discharge deflector roller is provided at said outlet, said conveyor belt means being deflected around said roller so as to open out said carrier plates at their outwardly disposed edges, whereby said material is released from said pockets as said conveyor belt means pass around said discharge deflector roller.

5. The apparatus of claim 1 wherein each said carrier plate means is wedge shaped tapering towards said outwardly disposed edge thereof.

6. The apparatus of claim 1 wherein a material feed control means is provided between said inlet and said compaction zone for volumetrically controlling material entering said compaction zone in said pockets.

7. The apparatus of claim 6 wherein said material feed control means is adjustable so as to volumetrically vary said material entering said compaction zone.

8. The device of claim 1 wherein a filler means is provided at said inlet.

9. The apparatus of claim 8 wherein full and empty signal devices are provided on said filler means.

10. The apparatus of claim 1 wherein at least one counter means is provided, mounted for actuation by said carrier plate means.

11. The apparatus of claim 1 wherein said conveyor belt means comprises chain means on which said carrier plate means are mounted.

12. The apparatus of claim 11 wherein said plate means are resiliently pivotally mounted.

13. The apparatus of claim 12 wherein said plate means are mounted on rubber pivot means.

14. The apparatus of claim 1 wherein said stripper means includes means for maintaining the inwardly disposed edges of the carrier plate means on the upper run of the conveyor belt means in close adjacency with the oppositely faced inwardly disposed edges of the carrier plate means on the lower run of the conveyor belt means such that as the conveyor belt means rotates the inwardly disposed edges of the carrier plates means on the upper run of the conveyor belt means strip off material disposed on the oppositely faced inwardly disposed edges of the carrier plate means on the lower run of the conveyor belt means, whereby an accurately known amount of material remains within the pockets.

15. The apparatus of claim 14 wherein said means for maintaining the inwardly disposed edges of the carrier plate means on the upper run of the conveyor belt means in close adjacency with the inwardly disposed edges of the carrier plate means on the lower run of the conveyor belt means comprises a pair of rollers disposed on the upper run of the conveyor belt means in the metering zone, and a threaded spindle mounted on one end to the pair of rollers and on the other end on the conveyor housing, whereby as said spindle is turned, the pair of rollers displaces the upper run of said conveyor belt means relative to the lower run of said conveyor belt means.

16. An apparatus for the metered feeding of flowable solid material from a delivery station to a sacking station by means of an endless conveyor belt means having an upper and lower run said apparatus comprising:
- a conveyor housing having an inlet and an outlet, and downstream of said inlet and upstream of said outlet a metering zone;
- a plurality of spaced carrier plate means disposed transversely on said conveyor belt means each having an inwardly and an outwardly disposed edge, the inwardly disposed edges of the plate means on the upper run of said conveyor belt means being disposed opposite the inwardly disposed edges of the plate means in the lower run of the conveyor belt means, adjacent pairs of said plates defining pockets for carrying said material; and
- stripping means disposed in said metering zone, said stripping means being associated with said oppositely facing inwardly disposed edges of said carrier plate means on the upper and lower runs of the conveyor belt means for volumetrically restricting said material in each said pocket in said metering zone.

17. The apparatus of claim 16 wherein said stripping means includes means for maintaining the inwardly disposed edges of the carrier plate means on the upper run of the conveyor belt means in close adjacency with the oppositely faced inwardly disposed edges of the carrier plate means on the lower run of the conveyor belt means such that as the conveyor belt means rotates the inwardly disposed edges of the carrier plate means on the upper run of the conveyor belt means strip off material disposed on the oppositely faced inwardly disposed edges of the carrier plate means on the lower run of the conveyor belt means, whereby an accurately known amount of material remains within the pocket.

* * * * *